United States Patent [19]

Bryan et al.

[11] 4,356,209

[45] Oct. 26, 1982

[54] FOOD COLORING AND FLAVORING AGENT FROM DEFATTED WHEAT GERM

[75] Inventors: Hugh D. Bryan, Savoy; Judy A. Carter, Champaign; Donald B. Trimble, Monticello, all of Ill.

[73] Assignee: A. H. Robins Company, Inc., Richmond, Va.

[21] Appl. No.: 952,508

[22] Filed: Oct. 16, 1978

[51] Int. Cl.³ .............................................. A23G 1/00
[52] U.S. Cl. .................................... 426/627; 426/631; 426/466
[58] Field of Search ............... 426/631, 466, 593, 627, 426/595, 533, 615, 598, 618, 658, 455, 511, 584, 459, 436, 596, 640, 463, 430

[56] References Cited

U.S. PATENT DOCUMENTS

| | | | |
|---|---|---|---|
| 1,030,711 | 6/1912 | Bortner | 426/466 X |
| 1,276,298 | 8/1918 | White | 426/593 |
| 1,395,831 | 11/1921 | Kelly | 426/466 X |
| 2,198,205 | 4/1940 | Musher | 426/466 X |
| 2,282,804 | 5/1942 | Musher | 426/618 |
| 2,388,298 | 11/1945 | Stephens | 426/466 X |
| 2,835,592 | 5/1958 | Rusoff | 426/593 X |
| 2,887,388 | 5/1959 | Rusoff | 426/533 |
| 3,036,919 | 5/1962 | Kretschmer, Jr. et al. | 426/465 |
| 4,119,740 | 10/1978 | Crespo | 426/631 |

*Primary Examiner*—Peter F. Kratz
*Assistant Examiner*—Michael L. Goldman

[57] ABSTRACT

A process for converting defatted wheat germ to a brown cocoa-like flavoring agent for foods which can serve as a replacement of 50% or more cocoa or chocolate without deleterious effect on expectable flavor and color, but with cost reduction of better than 50% cost of ingredient replaced.

1 Claim, No Drawings

FOOD COLORING AND FLAVORING AGENT FROM DEFATTED WHEAT GERM

BACKGROUND OF THE INVENTION

1. FIELD OF INVENTION

This invention is concerned with a novel cocoa-like coloring and flavoring agent for food which can serve as a cocoa replacer; i.e., an extender of cocoa or as a substitute therefor. Defatted wheat germ is toasted in the presence of steam with or without reducing sugars to produce the brown coloring and flavoring agent. It has previously been known to solvent extract oil useful for various purposes from wheat germ, leaving a defatted wheat germ residue having little, if any, commercial value. The present invention therefore involves the discovery that such residium can be heat treated in such a manner to produce a novel coloring and flavoring agent which has novel and superior characteristics over other attempts in the art.

2. DESCRIPTION OF THE PRIOR ART

Synthetic chocolate prepared from mixtures of sucrose, fat, milk, starch and solution of casein hydrolyzate, methionine, furfuryl alcohol, lysine and theobromine have been described, U.S. Pat. No. 2,816,834. Artificial chocolate flavor has also been produced by reacting hydrolyzed egg albumin, a saccharide and known flavor factors or chocolate, U.S. Pat. No. 2,887,384. Hydrolyzed oat and corn proteins have also been reacted with saccharides and known flavor factors of chocolate, U.S. Pat. Nos. 2,887,386 and 2,887,388. Unlike the foregoing, applicants' starting material contains cereal carbohydrates as well as proteins and is not a hydrolyzed material.

Carob powder and a product prepared from peanut flour have been used as chocolate extenders.

In recent years the demand for cocoa has exceeded the supply and there has been a tendency to use adulterants such as dyes. The agent of the present invention avoids harmful dyes used as food colorants to imitate chocolate color which have been under question as harmful to the health of the consumer.

The products of the present invention have the aroma, flavor, texture and mouth feel so as to be compatible with cocoa as a replacer and enhance the flavor of cocoa in foods which properties have not been previously developed from natural cereal products without addition of flavor additive.

SUMMARY OF THE INVENTION

The present invention provides brown cocoa-like agent made from defatted wheat germ pressure toasted to a variety of rich brown colors. Medium to dark "cocoa shades" can be produced by varying processing conditions and length of toasting time. The principal use of the compositions is the "replacer" for cocoa, which term as used herein means a substitute or extender for cocoa in animal and human foods.

The process of the present invention comprises heat toasting of defatted wheat germ, preferably in admixture with a reducing sugar source in the presence of steam. "Defatted wheat germ" is wheat germ from which most of the fats (oil) have been removed. Illustrative of defatted wheat germ suitable as starting material for the process of this invention are those defatted products which have been obtained by subjecting wheat germ to solvent extraction and defatting such as, for example, are obtained as by-product in the process of U.S. Pat. No. 2,314,282 wherein use of such solvents as hexane and ethylene dichloride is described. The defatted wheat germ should not contain more than 2% wheat germ oil (fat); preferably not more than 1% oil for the process of this invention. Higher oil content leads to burnt oil odor and rancidity in the product. Steam, preferably under pressure, favors the browning reaction while suppressing caramelization, the net effect of which is to favor the development of reddish-brown color similar to natural cocoa and development of bitter-note flavors while lessening caramel flavor.

In addition to the color formation, the toasting process develops aroma and taste characteristics that closely resemble the type of cocoa represented by the color. The dark shade has some of the bitter notes that are associated with dark chocolates, or alkalized or Dutched cocoa; the lighter shades are more bland and somewhat less aromatic.

When used with cocoa in, for example, brownies, cookies and cake, the products complement the cocoa and chocolate flavors and may be used as replacer for 50% or more of the cocoa or the cocoa in chocolate without changing color while accentuating flavor. Furthermore, in some baked goods such as brownies, the novel cocoa replacer of this invention has been found to provide a surprisingly high quality shiny crust not previously developed in the presence of other cocoa replacers.

It is therefore an object to provide a process for preparing novel brown compositions suitable for flavoring human and animal foods from defatted wheat germ which utilizes steam during a toasting period to emphasize bitter-note flavors and minimize caramel flavors.

Another object is to provide novel compositions comprised of defatted wheat germ having a brown color and flavor useful as chocolate or cocoa replacers, and which are particularly useful in extending chocolate or cocoa by replacing a major portion of the cocoa or chocolate in foods without changing color while accentuating flavor provided by pure cocoa.

Another object of the invention is to provide novel flavoring and coloring compositions comprised of a brown defatted wheat germ agent and cocoa and chocolate.

These and other objects will become apparent to one skilled in the art from a consideration of the following detailed embodiments.

DETAILED DESCRIPTION OF THE INVENTION AND PREFERRED EMBODIMENTS

The flavoring and coloring agents of the present invention are prepared by a novel process for toasting defatted wheat germ in the presence of 0 to about 60 psig steam, preferably at about 10 to about 40 psig steam pressure with agitation and temperatures within the agitated mass ranging from about 225° F. to about 310° F. preferably about 240° F.–290° F. for a time sufficient to cause medium to dark brown coloration and development of flavor notes characteristic of cocoa. Steam is added or allowed to form internally from moisture in the wheat germ to protect the product against scorching during the toasting process and to encourage the Browning or Maillard reaction.

The wheat germ particles are converted to a brown cocoa-like substance. Browning in the toasting procedure is speeded by adding reducing sugars or carbohydrates capable of generating reducing sugars and steam retards caramelization of carbohydrates whether they originate in the wheat germ or are added.

By way of illustration when the preferred range of steam pressure of 10-40 psig is used, the time required for complete toasting to a dark-brown color near the lower end of the preferred pressure range e.g. 10 psig is 7 to 8 hours and at the higher end of the preferred steam pressure range; e.g. 40 psig is 30-60 minutes. Time for toasting to a medium brown cocoa color will be approximately one half that at a given condition required for the dark color. Heat required for the toasting of defatted wheat germ is applied through the reaction vessel wall to avoid condensation of steam on the wall and resultant gumminess. Temperatures on the reactor surface are generally moderately higher than the temperature of the agitated mass, suitably about 50° F. higher.

The color of a product resembling a dark-brown cocoa color will have when ground to 200 mesh a color comparable to a printing standard color of Pantone* 463U and at 80 mesh will have a color comparable to Pantone* 462-C. The color of product resembling a medium brown cocoa color will have, when ground to 200 mesh, a color comparable to Pantone* 464U and at 80 mesh will have a color comparable to Pantone* 463-C.

*Pantone (Color) Matching System, 16th Ed., Pantone Inc. 1963, Moonachie, New Jersey 07004.

The best mode of carrying out the process of the invention is by toasting defatted wheat germ under positive steam pressure. The internal steam gauge pressure (psig) on the toasting vessel can be used as a means of measuring and controlling the temperature of the agitated mass within the reactor, inasmuch as the temperature-pressure relationship of steam is known and this correlation during toasting of wheat germ has been confirmed. The reaction vessel should have means for injecting steam and a vent for steam release in case it is desired to remove volatilized hexane or other solvents used in the defatting process. The vessel may be cylindrical and rotatable to permit agitation of the wheat germ as it tumbles through the steam atmosphere. Other reactors such as the steam-heated Strong-Scott Continuator which is a stationary vessel having a ribbon agitator are also satisfactory.

Some improvement in depth and tones of browning and in flavor are obtained when substances which are reducible sugars or are capable of supplying reducing sugars such as carbohydrate sugars are present during reaction. Preferably about 3-10% of such substance illustrated by sucrose or corn syrup solids based on weight of wheat germ is added.

Defatted wheat germ containing not more than 2 weight percent wheat germ oil is ground to 40-200 mesh, preferably to about 80-90 mesh, preferably mixed with a source of about 3-10 wt. % reducing sugars and charged to a reactor having means for agitation and means for venting, and means for introducing steam. External heat, preferably via jacketed steam heat, is applied raising the temperature of the reaction mixture to the range of 225° F. to 310° F. Optionally, steam is introduced as some of the gases developed are vented. Heating is continued for a predetermined time for particular temperatures which have shown sufficient browning has occurred. When the browning reaction is complete the reactor is vented and reaction mixture is subjected to vacuum to dry the product which is then removed from the reactor, cooled and ground to about 200-325 mesh screen size.

The following examples 1 to 7 illustrate in detail the best mode of carrying out the process and producing the best product therefrom. Protein values shown are 6.25×nitrogen values obtained by analysis.

EXAMPLE 1

Description of Starting Defatted Wheat Germ

Wheat germ which had been solvent extracted as hereinabove described to remove most of the oil and having the following typical analysis

|  | Weight Percent |
|---|---|
| Protein | 31-32 |
| Fat | less than 1.0 |
| Moisture | 5-6 | was ground to particle size 95% through a #80 screen.

Description of the Reactor

The reactor used was an elongated tubular vessel capable of holding internally at least 10 psig steam. The reactor was equipped with steam injection nozzle and a vent for relieving excess pressure. The reactor was steam jacketed and rotatable.

The above defatted wheat germ, 95 parts by weight, was mixed with 5 parts by weight powdered sucrose and the mixture charged to the reactor. Forty psig (287° F.) steam was introduced to the jacket while it was being rotated. The internal pressure was regulated by venting to 9 psig with internal temperature of reactants being maintained to about 237° F. while rotating the reactor for 7 hrs. The reactor was vented and vacuum applied to dry the product. After cooling, the product was removed from the reactor. About 20% of the solids were in large hard balls. The material was ground slowly in an Alphine pin mill twice. Screen analysis was as follows:

| on 200 mesh | 6.4% |
|---|---|
| through 200 mesh | 93.6% |
|  | 100.0 |

The color of the finely-ground product was approximately that of real dark cocoa. It was slightly bitter to the taste. Analysis of the product was as follows:

|  | Wt. % |
|---|---|
| Ash | 5.33 |
| Fat | 0.53 |
| Moisture | 2.60 |
| Protein | 36.30 |

Mixed with 14% shortening and water and baked, the product was an intense dark-brown color. When used as replacement for cocoa in recipes for chocolate cake, it was observed that up to about 50% of the real cocoa could be replaced with this product without noticeable change in expectable flavor.

EXAMPLE 2

Using the starting defatted wheat germ described in Example 1, 95 parts by weight mixed with 5 parts by weight corn syrup solids and the reactor described in Example 1, the mixture was heated while rotating the reactor as in Example 1 at an internal pressure of 10 psig (240° F.) and an external jacket temperature of 40 psig (287° F.) for 7.5 hours. The product was dried and emptied from the reactor as in Example 1. The product was dark brown and practically free of lumps. The product was ground to pass 95% through 200 mesh screen. Analysis of the product was as follows:

|  | Wt. % |
| --- | --- |
| Ash | 5.06 |
| Fat | 1.00 |
| Moisture | 1.60 |
| Protein | 36.4 |

The color of the finely-ground product was approximately the shade of real dark cocoa and could be used as a substitute for up to 50% of cocoa in cake and other foods.

EXAMPLE 3

Using the same starting defatted wheat germ, 85 parts by weight, and the reactor described in Example 1, mixed with 10 parts by weight mill wheat bran and 5 parts by weight corn syrup solids, the mixture was heated for 7.5 hrs. at 240° F. internal temperature and as in Example 1, dried and ground to pass 95% through 200 mesh screen. Analysis of the product was as follows:

|  | Wt. % |
| --- | --- |
| Ash | 5.49 |
| Fat | 0.98 |
| Moisture | 0.60 |
| Protein | 37.40 |

EXAMPLE 4

Using the starting defatted wheat germ described in Example 1, 95 parts by weight mixed with 5 parts by weight corn syrup solids and a steam-heated, ventable Strong-Scott continuator having a ribbon agitator and an injectable steam source, the mixture was heated while mixing at an internal steam pressure of 10 psig (240° F.) having an external jacket pressure of 40 psig (287° F.) for 7¾ hours. After drying by subjecting the reaction mixture to reduced pressure the dark-brown product was practically free of lumps. The product after grinding to pass 95% through 200 mesh was approximately the shade of dark cocoa (Pantone 463U) Analysis of the product was as follows:

|  | Wt. % |
| --- | --- |
| Fat | 0.85 |
| Moisture | 6.2 |
| Protein | 32.81 |

EXAMPLE 5

Using the starting defatted wheat germ described in Example 1, 95 parts by weight mixed with 5 parts by weight corn syrup solids and the reactor used in Example 4, the mixture was heated while mixing at an internal pressure of 20 psig (259° F.) and an external jacket pressure of 57 psig (304° F.) for 2.75 hours. The product was dark brown and practically free of lumps. Analysis of the product was as follows:

|  | Wt. % |
| --- | --- |
| Fat | 0.66 |
| Moisture | 4.7 |
| Protein | 33.0 |

The color of the finely ground product (95% through 200 mesh) was approximately the shade of dark cocoa (Pantone 463U) and had some of the characteristic odor of cocoa.

EXAMPLE 6

Using defatted wheat germ as described in Example 1, 95 parts by weight mixed with 5 parts by weight corn syrup solids and the reactor used in Example 4, the mixture was heated while mixing at an internal pressure of 30 psig (274° F.) and an external jacket pressure of 78 psig (322° F.) for 72 minutes. The release of internal pressure from the hot vessel caused a flash drying of the dark brown product. The product analysis was as follows:

|  | Wt. % |
| --- | --- |
| Fat | 0.85 |
| Moisture | 2.5 |
| Protein | 33.4 |

Color of the finely ground product (95% through 200 mesh) was comparable to a shade of dark cocoa (Pantone 463U) and had some of the characteristic odor of cocoa.

EXAMPLE 7

Using defatted wheat germ as described in Example 1, 95 parts by weight mixed with 5 parts by weight corn syrup solids and the reactor used in Example 4, the mixture was heated with constant mixing at an internal pressure of 40 psig (287° F.) and an external jacket pressure of 104 psig (340° F.) for 39 minutes. The product was dark brown and practically free of lumps. Analysis of the product was as follows:

|  | Wt. % |
| --- | --- |
| Fat | 0.78 |
| Moisture | 2.5 |
| Protein | 33.2 |

The color of the finely ground product (95% through 200 mesh) was approximately the shade of dark cocoa and had some of the characteristic odor of cocoa. Use of the product as replacement of up to 50% of cocoa in bakery goods was demonstrated. The color of the finely-ground product was approximately the shade of real dark cocoa and could be used as substantial replacement of chocolate or cocoa in cake and other foods.

EXAMPLE 8

Following the procedure of Example 4, the mixture was heated for 3.5 hours. The product was approximately the shade of medium brown cocoa.

EXAMPLE 9

Using only the starting defatted wheat germ (no additives) and the reactor described in Example 1 under the same conditions for 7 hrs a dark brown product was obtained. The product was granular with small lumps after drying and removal from the reactor. The finely-ground product was suitable for brown coloring of cookies with or without cocoa.

Operating conditions in Examples 4–7 are summarized in Table 1.

TABLE 1

| Example No. | Internal Steam Pressure Psig | Internal Temperature of Mixture °F. | Steam External Temperature °F. | Time Required to Toast to Dark-brown Cocoa Replacer, Hr. |
|---|---|---|---|---|
| 4 | 10 | 239 | 287 | 7.5 |
| 5 | 20 | 259 | 304 | 2.75 |
| 6 | 30 | 275 | 322 | 1.20 |
| 7 | 40 | 287 | 340 | 0.60 |

Other Practical Applications

The product of Example 1. In addition to being replacement for cocoa the products of the process generally have about 36% protein and as such have nutritional values aside from flavor and color.

They have been shown to be useful when used alone in providing a special mocha flavor to cookies, fudge, cereal and marshmallow.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:

1. An extended cocoa powder comprising cocoa and a defatted wheat germ having up to about 2% by weight of fat content having been toasted to a medium to dark color and having a corresponding mild to strong cocoa taste.

* * * * *